Figure 1:
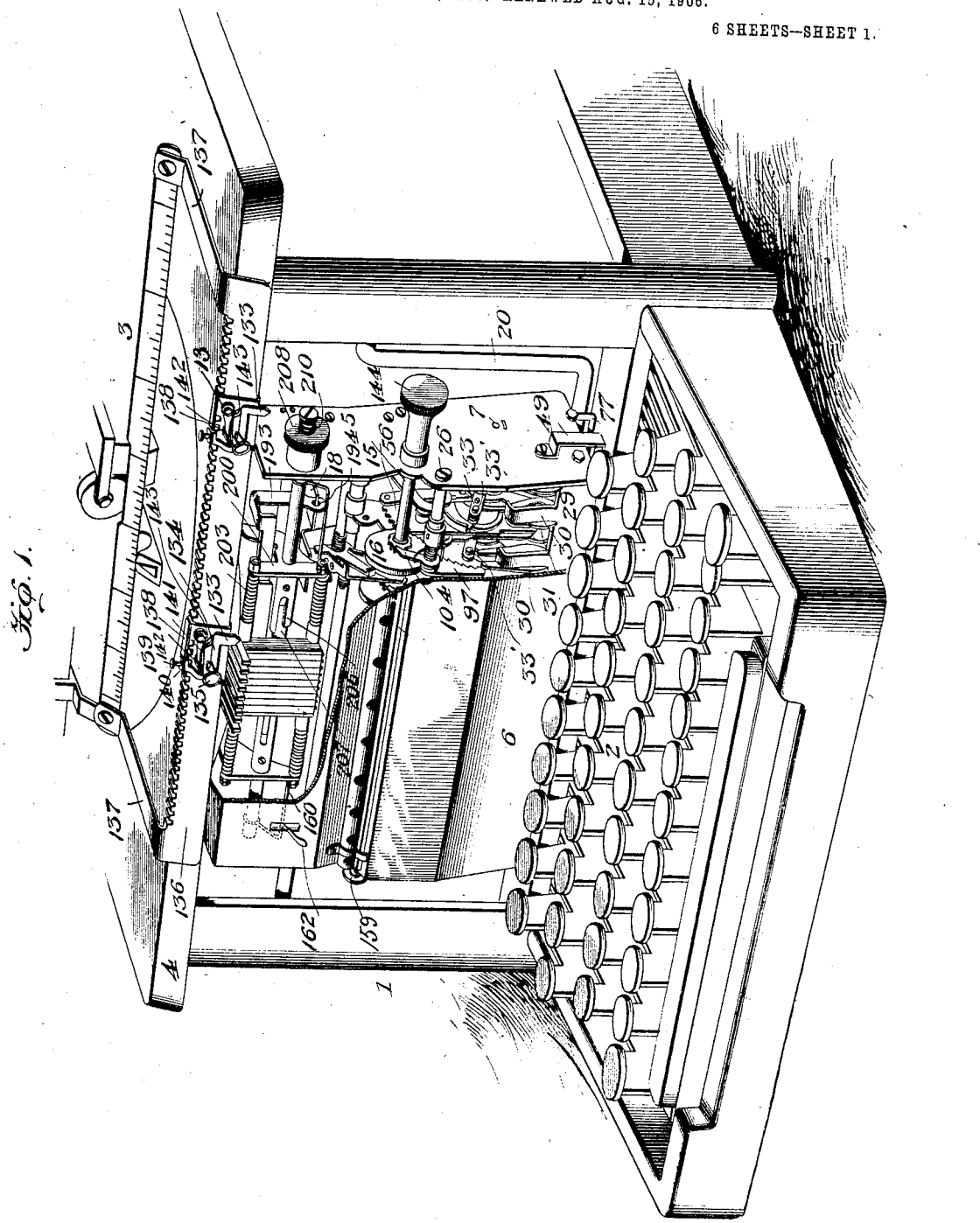

No. 838,996. PATENTED DEC. 18, 1906.
J. T. HOWIESON.
CALCULATING MACHINE.
APPLICATION FILED MAY 28, 1903. RENEWED AUG. 15, 1906.

6 SHEETS—SHEET 1.

Witnesses
Inventor
John T. Howieson
by Sturtevant & Greeley
Attorneys

No. 838,996. PATENTED DEC. 18, 1906.
J. T. HOWIESON.
CALCULATING MACHINE.
APPLICATION FILED MAY 28, 1903. RENEWED AUG. 15, 1906.

6 SHEETS—SHEET 2.

Witnesses

John T. Howieson
Inventor by Sturtevant & Shirley
Attorneys

No. 838,996. PATENTED DEC. 18, 1906.
J. T. HOWIESON.
CALCULATING MACHINE.
APPLICATION FILED MAY 28, 1903. RENEWED AUG. 15, 1906.

6 SHEETS—SHEET 3.

Witnesses
M. Virginia Thompson
Laura V. Brereton

Inventor
John T. Howieson
by Sturtevant & Henly
Attorneys

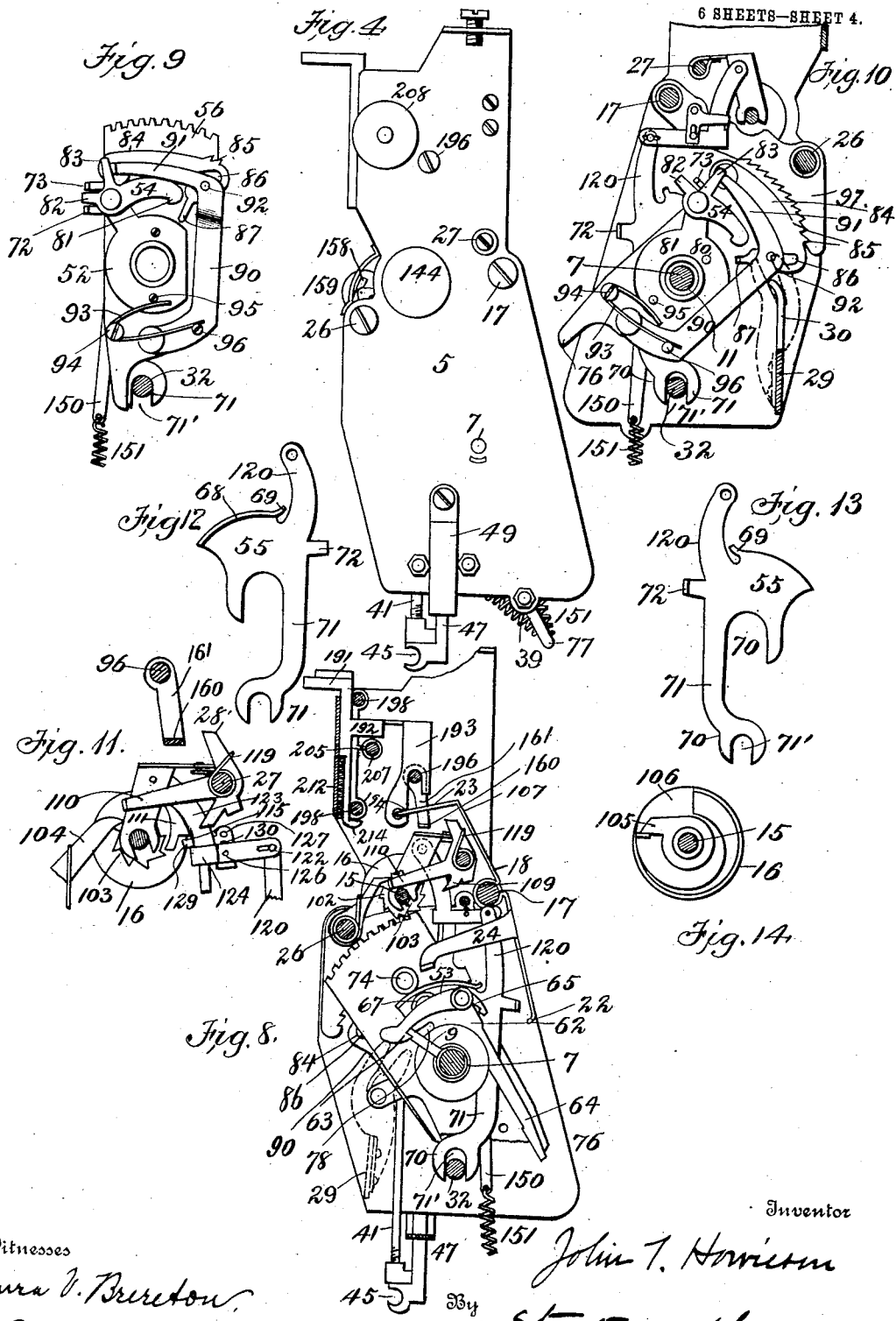

No. 838,996. PATENTED DEC. 18, 1906.
J. T. HOWIESON.
CALCULATING MACHINE.
APPLICATION FILED MAY 28, 1903. RENEWED AUG. 15, 1906.
6 SHEETS—SHEET 5.
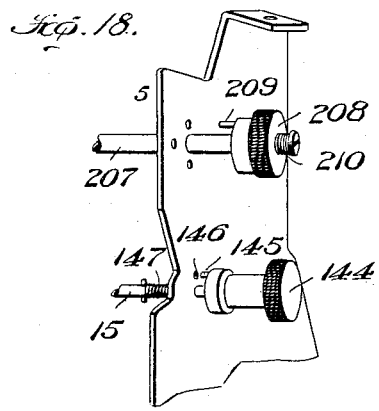
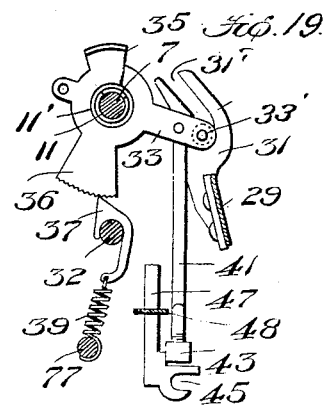
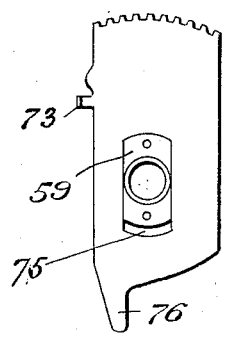
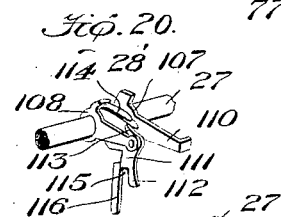
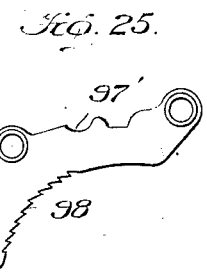
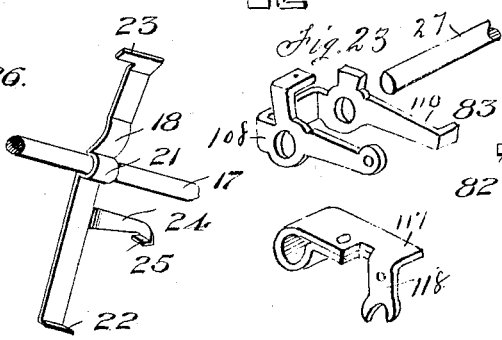
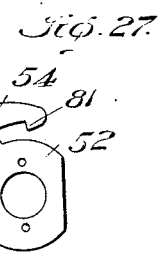
Witnesses
Inventor
John T. Howieson
by Sturtevant & Mulky
Attorneys

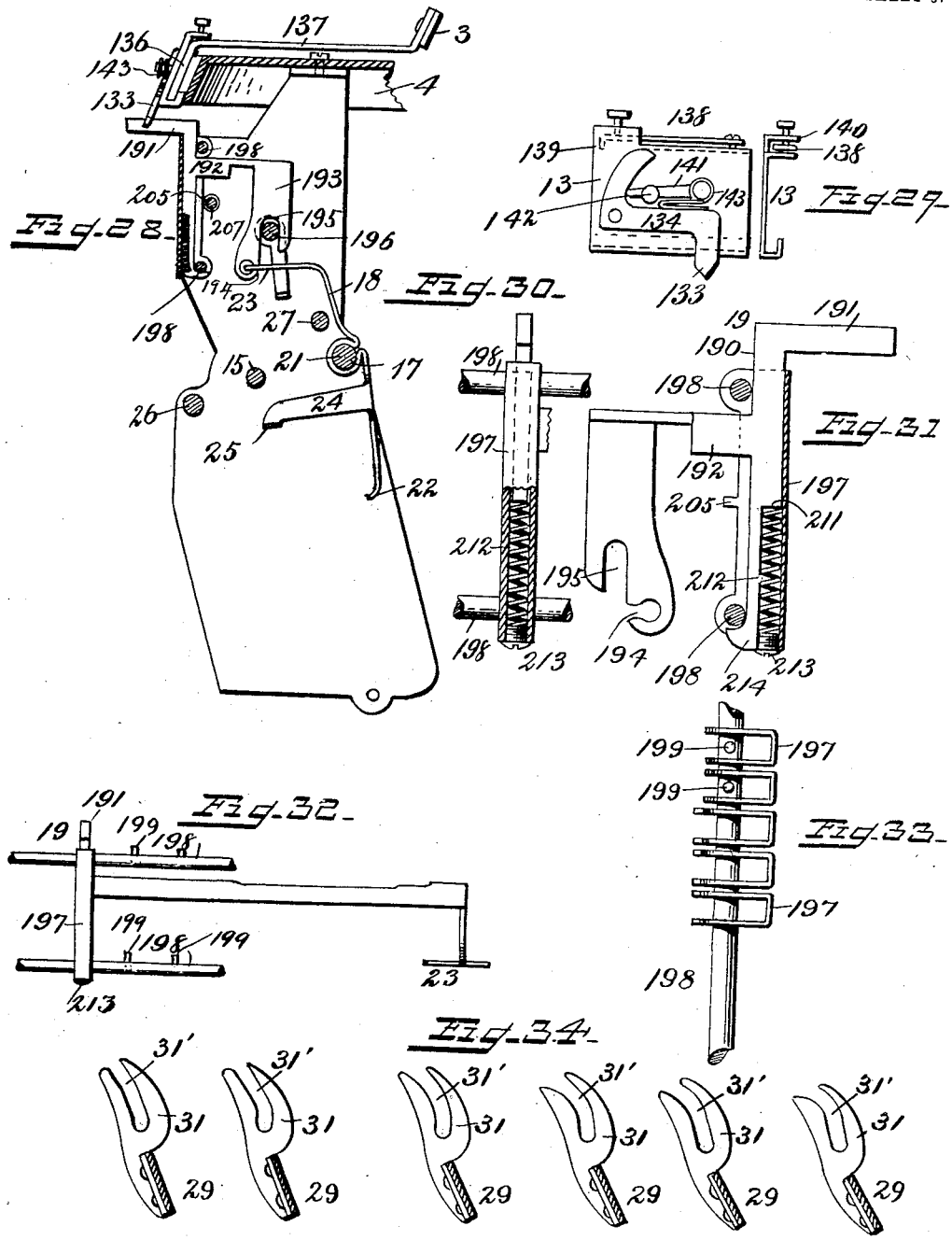

UNITED STATES PATENT OFFICE.

JOHN T. HOWIESON, OF PHILADELPHIA, PENNSYLVANIA, ASSIGNOR TO ARITHMOGRAPH COMPANY, A CORPORATION OF NEW JERSEY.

CALCULATING-MACHINE.

No. 838,996.  Specification of Letters Patent.  Patented Dec. 18, 1906.

Application filed May 28, 1903. Renewed August 15, 1906. Serial No. 330,740.

*To all whom it may concern:*

Be it known that I, JOHN T. HOWIESON, a citizen of the United States, residing at Philadelphia, in the county of Philadelphia, State of Pennsylvania, have invented certain new and useful Improvements in Calculating-Machines, of which the following is a description, reference being had to the accompanying drawings and to the figures of reference marked thereon.

My invention relates to calculating-machines, and particularly to the class of calculating-machines designed and intended to be used in connection with a type-writing machine for adding numbers as they are printed by the operation of the numeral-keys. A machine of this class forms the subject-matter of United States Patent No. 712,381, granted to me October 28, 1902.

The machine of the present application in general features of construction and operation is similar to the machine of my patent, comprising, broadly, a construction adapted to be readily connected to the frame of a type-writing machine carrying calculating mechanism adapted to be operated by the numeral-keys only when the paper-carriage has reached a predetermined point in its travel, the numeral-keys being adapted to be operated to print without effecting the operation of the calculating mechanism at all times during the travel of the paper-carriage except when the carriage has reached such predetermined point in its travel.

A particular feature of the machine of the present application is the construction by which in the operation of the calculating mechanism by the numeral-key the operation of the registering mechanism is effected before the key has completed its stroke and the registering mechanism disconnected from the key, so that before completing its stroke the key is freed from the additional load of the registering mechanism, and in effecting the printing of its character its action is unimpeded, with the result that it prints its character as clearly as does any of the letter-keys. Where the numeral-key carries the additional load of the registering mechanism throughout its stroke its action on its type-bar is sluggish, with the result that the type-bar is pushed rather than impelled to the printing-point, causing a blurring of the print. The disconnection of the registering mechanism from the key permits the key to return quickly when released, the registering mechanism being returned independently, and thus permits of the operation of another key or a second operation of the same key to be effected at once without waiting for the return of the registering mechanism to normal position.

A further feature of the invention of the present application is the construction by which the registering device in its operation by the numeral-key is caused to overthrow slightly, so as to avoid the possibility of not giving it sufficient movement, and subsequent to the disconnection of the registering mechanism from the key the registering device is given a reverse movement independent of the movement of the key sufficient to correct the overthrow and leave the registering device finally in its true position.

The invention of the present application includes improvements in the carrying mechanism and in the tripping devices and the means for shifting their positions and includes also improvements in the operating and register-actuating mechanism, as hereinafter more fully disclosed; and the invention consists in the construction and combinations of elements hereinafter described, and particularly pointed out in the claims.

Figure 2:
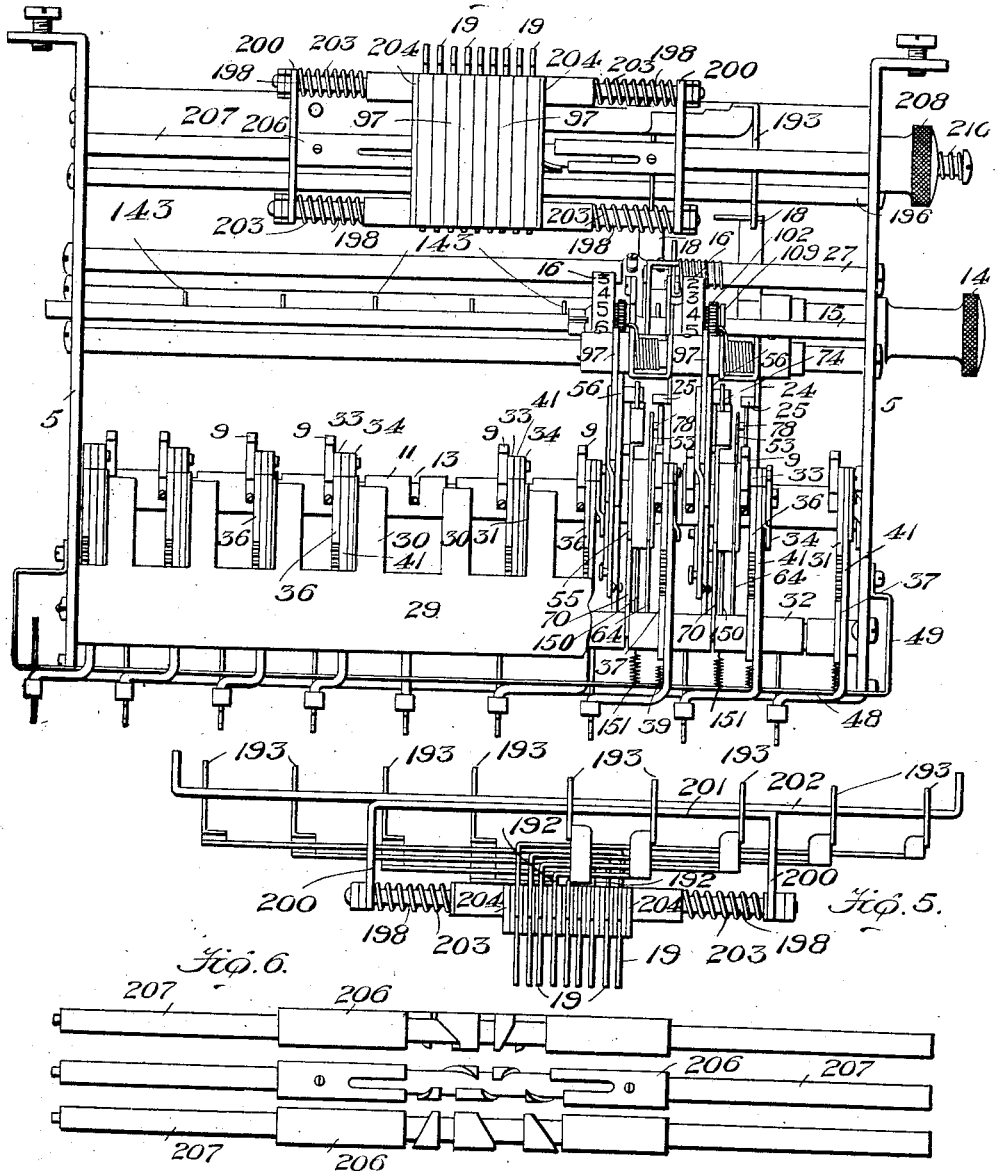
Figure 3:
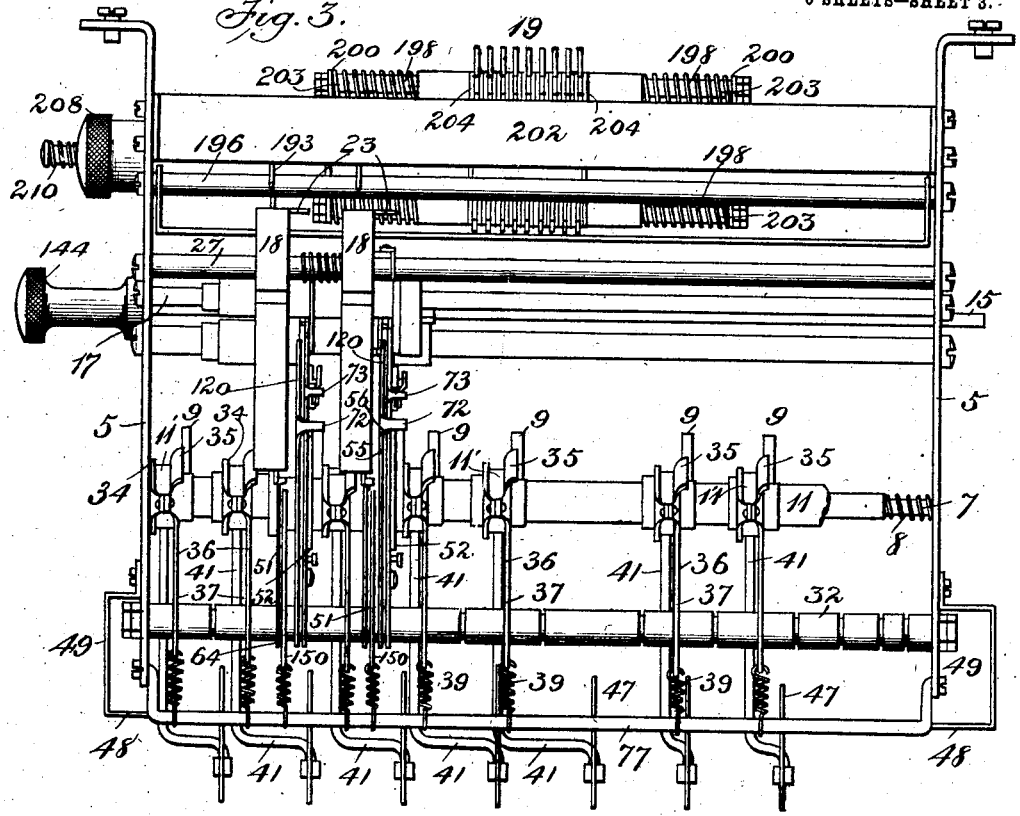

Referring to the drawings, Figure 1 is a perspective view showing the invention in position on a type-writing machine, the front plate being partly broken away, so as to show one of the series of registering devices with its actuating and operating mechanism complete, parts belonging to the other registering devices of the series not being shown. Fig. 2 is a front view of the invention, the front plate being removed, showing two of the series of registering devices with their actuating and operating mechanisms complete and showing one of the devices of the carrying mechanisms complete, parts belonging to other registering and carrying devices of the series not being shown. Fig. 3 is a rear view of the parts shown in Fig. 2. Fig. 4 is an end elevation of the invention. Fig. 5 is a detail plan view of the tripping devices and their connections. Fig. 6 shows the cam for shifting the tripping devices in plan, front elevation, and bottom views.

Figures 7, 15, 16, 17:
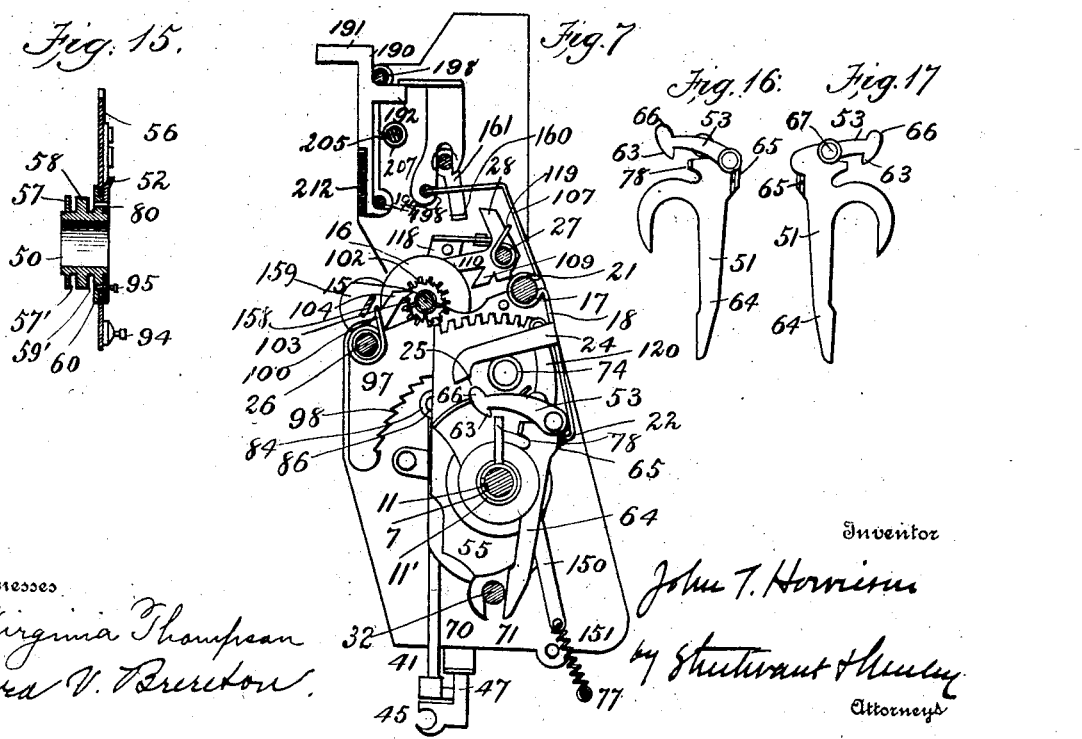

Figs. 7 and 8 are detail views showing the register-actuating mechanisms in normal position and in operated position, respectively. Figs. 9 and 10 are detail views showing the register-actuating mechanism in normal position and operated position, respectively. Fig. 11 is a detail sectional view showing the carrying mechanism. Figs. 12 and 13 are detail views of the cam-plate. Fig. 14 is a detail view, on an enlarged scale, of the register-wheel with its cam and radial arm. Fig. 15 is a sectional detail view of the bearing-piece, showing the segmental rack in position. Figs. 16 and 17 are detail views of the cam-carrier 51. Fig. 18 is a detail perspective view showing the means for locking the shaft which carries the registering-wheels and the shaft which carries the cam for shifting the tripping devices. Fig. 19 is a detail view of the operating-arm and its connections. Figs. 20 and 21 are detail perspective views showing parts of the carrying mechanism. Fig. 22 is a plan view showing the double-arm pawl and arm 118. Fig. 23 shows the double-arm pawl and arm 118. Figs. 24, 25, 26, and 27 are detail views showing, respectively, the segmental rack, the rack-plate, the tripping-arm, and the pawl-carrier 52. Fig. 28 is a detail view showing the tripping mechanism. Fig. 29 is a detail view, on an enlarged scale, showing the tripping-cam and plate carrying it. Figs. 30 and 31 are detail sectional views, on an enlarged scale, showing the tripping device and box carrying it. Fig. 32 is a front view of one of the tripping devices. Fig. 33 is a plan view, on an enlarged scale, of the boxes carrying the tripping devices; and Fig. 34 shows a series of the slotted arms carried by the rocking plate.

Referring to the drawings, 1 indicates the frame of the type-writing machine.

2 indicates the keyboard.

3 indicates the paper-carriage, and 4 indicates the top plate.

The calculating device is arranged, as in my patent above referred to, directly in rear of the keyboard and is secured to the top plate 4. In order to provide a proper place for the calculating device, the rod 20 of the shifting mechanism is bent downward, as shown. As in my patent before referred to, the calculating device comprises end plates 5, secured to the top plate 4, connected by rods and serving to support the shafts and rods on which the operating parts are carried, and a front plate 6, suitably secured to the end plates.

The main shaft 7 is substantially the same as in my patent and, as shown in Fig. 3, is provided at one end with spring 8 for returning it to normal position and with radial arms 9. The radial arms are slightly adjustable and are held in position by set-screws 10. The stationary sleeve 11 surrounds the shaft 7 concentric therewith and is provided with the slots 13, as shown in Fig. 2 in, which the radial arms 9 move. On the sleeve are supported the devices by which movement is transmitted to the radial arms 9 and the devices by which the movement of the radial arms may be transmitted to the registering-wheels.

The registering-wheels 16 are carried on a shaft or rod 15 and are each provided with a pinion 102 and a ratchet-wheel 103. In the present device, as in the device of my patent, it will be understood that a registering-wheel is provided for each order of digits and separate actuating devices are provided for each registering-wheel. It will also be understood that the registering-wheels are arranged with the units-wheel at the right. As in my patent, I have shown nine registering-wheels, though a greater or less number may be used.

In the present invention, as in my patent, the numeral-keys when depressed rock the main shaft without effecting any movement of the registering-wheels unless by the action of the tripping device the actuating mechanism of one of the registering-wheels is thrown into position to be operated by the radial arms 9. In the construction of the tripping devices and as in the construction of the actuating devices for the registering-wheels, as well as in other features of construction, my present invention differs from that of my patent.

The tripping-arms 18, Figs. 15 and 26, have their bearings on stationary rod 17, which is located to the rear of and slightly above the rod 15, Figs. 7 and 28. The tripping-arms are preferably formed of sheet metal bent at 21 to embrace the rod 17 and having the portion below the rod 17 provided with a forwardly-projecting end 22. Above the rod 17 the arm is curved forward and has at its end a lateral extension 23, by which is afforded a front edge of greater length than the width of the main portion of the tripping-arm. At a point below the rod 17 the tripping-arm is provided with a finger 24, which extends forward and downward, terminating in a lateral extension 25.

The tripping devices 19, Figs. 30, 31, and 32, each comprise a vertical portion 190, having at its upper end a forwardly-extending arm 191 and having a rearwardly-extending arm 192, which is rigidly connected with an upright 193, arranged substantially parallel with the vertical portion 190 and provided with a notch 194, Figs. 7, 8, and 28, which embraces the front edge of the upper end of the tripping-arm 18.

The tripping devices are so located that their arms 191 will lie in the path of a tripping-cam 133, carried by the paper-carriage. The upper edges of the arms 191 are preferably beveled, so that the tripping-cam will readily depress them.

The uprights 193 are provided with open-ended guide-slots 195, which fit over a stationary rod 196, secured at its ends in the end plates 5.

The vertical portions 190 of the tripping devices are each inclosed in a box 197, in which they are free to move vertically. The boxes 197 are each open at the top and back and are provided near their upper and lower ends with openings which fit over rods 198.

Within the boxes 197, Figs. 30, 31, and 33, the vertical portions 190 are each provided with a shoulder 211, against which bears the upper end of a spring 212, the lower end of the spring bearing against a screw 213, which engages the sides of the box and by which the tension of the spring may be adjusted. The spring serves to hold the tripping devices normally in elevated position. At its lower end each of the vertical portions 190 is provided with a stop-lug 214, which engages the under side of the lower rod 198. As in the machine described in my patent before referred to, it is sometimes desirable to separate the boxes in groups to allow for the printing of the commas between certain numbers, as between dollars and cents and hundreds and thousands, and for this purpose the following mechanism is provided: Two of the boxes—the fourth and fifth, counting from left to right—are prevented from moving on the rods by pins 199, Figs. 32 and 33. The other boxes are free to be moved to and from the two boxes referred to. The rods 198 are carried by arms 200, Fig. 5, extending forward from a plate 201, which is secured to a bar 202, which is fastened at its ends to the end plates 5. Each of the rods 198 carries a spring 203, bearing at one end against one of the arms 200 and at the other end bearing against a plate 204, carried by the rods 198, and bearing against the outer one of the boxes 197. These springs normally hold the movable boxes against the fourth and fifth boxes above mentioned.

Each of the boxes except the fourth and fifth is provided about midway of its length with a rearwardly-extending lug 205, Figs. 31 and 33, which engages a cam-groove in a sleeve 206, Fig. 6, carried by shaft 207, which has bearings in the arms 200 and in the end plates 5. On one end exterior to the end plate this shaft is provided with a milled head 208 for rotating it. The milled head is mounted on the shaft so as to be capable of longitudinal movement thereon and is provided on its inner face with a pin 209, Fig. 18. The end plate is provided with a series of holes, three in number, to receive the pin 209. A spring 210 serves to hold the milled head against the end plate with the pin 209 in one of the holes, thus locking the shaft against accidental rotation. By drawing the milled head outward against the force of the spring 210 the pin 209 is freed from engagement and the milled head and shaft may be rotated to shift the position of the movable boxes.

The sleeve 206 bears at its end against the inner faces of the arms 200 and is secured to the shaft 207 by screws, as shown. The cam-grooves in the sleeve are so formed that when the shaft is rotated in one direction the three boxes at the left will be moved bodily to the left one space and the three boxes at the right will be moved bodily one space to the right, so that the boxes will then be in three groups of three each with a space between each group, and the cam-grooves are so formed that when the shaft is rotated in the opposite direction the two boxes at the left will be moved bodily one space to the left, the right-hand box will be moved two spaces to the right, and the next three boxes will be moved one space to the right, so as to leave the boxes in four groups of two, three, three, and one box, respectively, with a space between each group.

The first arrangement is intended to provide a space for printing a comma between each group of three digits to separate thousands from hundreds and millions from hundred thousands. The second arrangement is intended for use in printing figures representing dollars and cents, the space between the group of two at the left and the adjacent group being intended for printing the decimal-point, the spaces between the other groups being intended for printing commas.

The rearwardly-extending arms 192 of the tripping device, which is in the center of the group, extends directly backward to its upright 193. The arms 192 of the tripping devices to the right of the center of the group extend rearward from the vertical portions 190 from points above the shaft 207 and are connected with their uprights 193 by horizontal portions of varying length extending to the right, as shown. The arms 192 of the tripping devices to the right of the center of the group extend rearward from the vertical portions 190 from points below the shaft 207 and are connected with their uprights by horizontal portions of varying length extending to the left, as shown.

In shifting the position of the tripping devices, as above described, the uprights 193 will slide horizontally relative to the ends of the tripping-arms, a sufficient movement being permitted without disengagement by reason of the length of edge afforded by the extension 23.

The tripping-cam 133, Figs. 1 and 29, is formed on the end of a bell-crank arm 134, pivoted at 135 to a plate mounted to slide on a bar 136, connected by arms 137 to the paper-carriage. The plate 13, to which the bell-crank arm 134 is pivoted, is provided with suitable means for engaging the bar 136 and is also provided with a spring-arm 138, secured to it at one end and having at its free end a detent 139, adapted to engage teeth on the upper edge of the bar. A lug 140 on the plate extending above the free end of the spring-arm 138 permits the detent to be raised sufficiently to disengage it from the teeth of the bar and at the same time protects the free end of the arm against being raised sufficiently to endanger its breakage.

The vertical arm of the bell-crank lever 134 is provided with a cam-surface with which engages the end of an arm 141, pivoted to the plate and provided with a forwardly-extending finger-piece 142. A spring 143, connected at one end to the pivot of the arm 141 and at the other end bearing against the horizontal portion of the bell-crank lever, serves to normally depress the tripping-cam into position to act on the tripping devices 19. By lifting the arm 141 by the finger-piece 142 the bell-crank lever is turned on its pivot to raise the tripping-cam out of position to act on the tripping devices.

The machine should be provided with two or more tripping devices, any one or all of which may be used, as desired.

The rocking plate 29, Figs. 1, 2, and 19, is pivoted, as in my patent before referred to, at its ends to the end plates 5 near their lower ends and near their front edges and has a rearwardly-extending arm arranged to contact with the shaft 32 when the rocking plate is in normal position. The stop-arms 30 are preferably formed integrally with the rocking plate, and to the inner face of the rocking plate are secured the slotted arms 31.

In connection with the mechanism for operating each of the registering-wheels I provide a lever 33, journaled on a collar 11', secured to the stationary sleeve. To prevent movement of the levers longitudinally of the shaft, each lever has connected with it an arm 34, which is also journaled on the collar, the collar having between the bearing of the lever and arm a portion of greater diameter than the bearings. One of the levers 33 is arranged in proximity to one of each pair of the radial arms 9, and each of the levers is provided with a lateral projection 35, adapted to engage the rear of the arm 9 and carry it forward with it, rocking the main shaft 7.

Each of the levers 33 is provided with a pin or roller 86, adapted when the lever is drawn downward to enter the slot 87 of the slotted arm 31, and thus to cause the rocking plate 29 to rock on its pivots to move the end of the stop-arm 30 rearward into the path of the register-actuating mechanism to effect the locking of the segmental rack and the disengagement of the register-actuating mechanism from the mechanism operated by the depression of the numeral-key, as hereinafter described.

The shape of the cam-slots 87 in the several arms 31 differ according to the numeral value of the key which corresponds to them, so as to move the stop-arm the distance necessary in each case. (See Fig. 34.) The slot in the arm corresponding to the "1" key is of such shape that the rocking plate will be rocked immediately upon the entrance of the pin 86 into the slot sufficiently to move the end of the stop-arm into position to effect the locking of the segmental rack as soon as the segmental rack has caused the registering-wheel to rotate one space, while the slot in the arm corresponding to the "9" key will be so shaped as to cause only sufficient movement of the rocking plate to move the end of the stop-arm into position to cause the locking action to take place when the segmental rack has caused the register-wheel to rotate nine spaces.

The projections 35 will be so positioned on the several levers as to effect a movement of the radial arm corresponding to the different numerals.

To provide for a full stroke of the adding-key when once started, there extends downward from each of the levers 33 a toothed segment 36, Fig. 19, which as the lever is rocked engages a dog 37, pivoted on stationary rod 32 and having a tailpiece 38, to which a spring 39 is connected, the other end of the spring being connected to stationary rod 77. As the lever is rocked the dog engages the teeth of the segment and prevents its return movement until the lever is depressed its full stroke. As the stroke is complete the segment passes beyond the point of the dog, and as the lever returns to normal position the segment swings the point of the dog in the opposite direction and passes freely over it.

To disconnect the adding mechanism from the type-writer keys, there is provided the following mechanism: Near the front end of the lever 33, Fig. 19, and preferably between it and the arm 34 is pivotally connected the upper end of link 41, connecting the lever with one of the numeral-keys of the type-writing machine. The link comprises an upper part 42 and a lower part 43, having a screw connection. The lower part 43 of the link is provided near its lower end with an open slot 45, adapted to engage a pin 46, carried by the key-lever. The part 43 of the link is also provided with an upwardly-extending arm 47. A flat bar 48, having its ends bent upward to form arms 49, Figs. 2 and 3, the upper ends of which are pivoted to the end plates 5, preferably on the outer faces of the end plates, is provided with slots 48', through which the arms 47 slide freely. By swinging the bar 48 the slots 45 of all of the links 41 are simultaneously caused to engage the pins 46 of the numeral-keys or are disengaged therefrom, as desired. The arms 49 being outside the end plates afford convenient means for swinging the bar.

The device by which the rocking of the main shaft is caused to actuate the register-wheels are arranged in groups corresponding in number with the registering-wheels. Each group comprises a bearing-piece 50, Fig. 15, supported on and free to rotate on the sleeve 11, a pawl-carrier 51, Fig. 16, arranged to rock on the bearing-piece and carrying pawl 53, a pawl-carrier 52 carrying pawl 54, a cam-plate between the pawl-carriers in proximity to the pawl-carrier 51, and a segmental rack 56 in proximity to the pawl-carrier 52.

The bearing-piece 50, Fig. 15, is circular in cross-section and comprises an outer portion 57, a central portion 58, a flange 60, and a non-cylindrical portion 59, Fig. 24. Between the portions 57 and 58, Fig. 15, is formed an annular groove 57′, in which is received the pawl-carrier 51. In the rear of the portion 58 is formed a recess 58′, in which is pivotally secured the upper end of a depending arm 150, Fig. 7, the lower end of which is connected by a spring 151 to the rod 77. Between the portion 58 and the annular flange 60 is formed an annular groove 59′, which receives the cam-plate 55. Against the opposite face of the annular flange 59 the segmental rack 56 is placed.

The pawl 53 is pivoted to the rearward extension 62 of the pawl-carrier 51 and is so located that its forward hooked end 63 is in the plane of one of the radial arms 9, so that when depressed the hooked end will be engaged by the end of the arm. The pawl-carrier 51 is provided in rear of the main shaft with a depending arm 64 of such length that when the pawl-carrier is in normal position the end of this arm will rest against the stationary rod 32. The bearing of the pawl-carrier is open downward, so that it may be readily placed in position in the groove 57′ in assembling the parts. Above its bearing the pawl-carrier is provided with a laterally-extending finger 78 in the path of the radial arm 9 beneath the pawl 53.

The pawl 53 is provided with a tailpiece 65 directly below its pivot, having its end bent laterally into the plane of the pawl-carrier and adapted to contact with the rear edge of the pawl-carrier. At its front end, above the hook 63, the pawl 53 is provided with an upwardly-extending finger 66. The pawl-carriers 51 are each located in front of one of the tripping-arms 18. When in normal position, the pawl-carrier rests with its arm 64 against the stationary rod 32 and with the tailpiece 65 of the pawl against the lower end 22 of the tripping-arm, the position of the tripping-arm being such that by contact of its end 22 with the tailpiece the forward end of the pawl will be held in elevated position out of the path of the end of the radial arm 9. When the tripping-arm is moved by the depression of its tripping device 19, its lower end is swung back out of contact with the tailpiece 65, and at the same time the lateral extension 25 of the finger 24 strikes the finger 66, depressing the forward end of the pawl so that its hooked end 63 will lie in the path of the end of the radial arm.

On the side next the cam-plate 55 the pawl-carrier is provided with a roller 67, Fig. 17, for the purpose of lifting the cam-plate.

The cam-plate 55, Figs. 12 and 13, has its upper edge curved, as shown, the edge being bent over toward the pawl-carrier 51 to form a flange 68. The rear end of this flange is bent upward, as shown at 69. The cam-plate has its bearing in annular groove 58′ of the bearing-piece and is formed with an open slot 70 for convenience in assembling. The cam-plate is provided with a depending arm 71, which is provided with an open slot 71′, fitting over the rod 32. The cam-plate is thus held from rotation and at the same time permitted vertical movement. The cam-plate is provided on its rear edge with a finger 72, bent at right angles and extending to the left a sufficient distance to engage the under side of the tailpiece 82, Fig. 9, of the pawl 54, carried by the pawl-carrier 52.

The segmental rack 56 carries on the side next the cam-plate a roller 74, Fig. 8, so placed as to ride on the flange 68. The rack has an opening 75 formed therein, adapted to fit over and slide on the non-circular portion 59 of the bearing-piece 50. At its lower end the rack is provided with a stop-finger 76, which when the rack is in normal position contacts with the rod 32. The rack has on its upper edge ten teeth, adapted when the rack is raised into operative position to mesh with the teeth of the pinion 102 of the registering-wheel.

The segmental rack is provided with a rearward extension having a laterally-bent end forming a finger 73, which lies above the tailpiece 82 of the pawl 54.

The pawl-carrier 52 is secured by a screw or rivet 80 against the face of the non-circular portion 59 of the bearing-piece, confining the segmental rack between it and the annular flange 60. To the upper rear portion of the pawl-carrier is pivoted the pawl 54, Fig. 9. The forward arm of this pawl is slightly longer than the pawl 53 and has a hooked end 81 adapted to be engaged by the upper end of a radial arm 9. This pawl has a tailpiece 82, which when the parts are in normal position lies immediately above the finger 72 of the cam-plate and immediately below the finger 73 of the segmental rack. Extending upward from the pawl near its pivot is a finger 83.

Pivoted to the segmental rack near its rear edge above and in the plane of the pawl-carrier 52 is a forwardly-extending arm 84, provided on its upper edge near its free end with ratchet-teeth 85, preferably two in number.

in its free end is formed a cam-slot 86, and near its free end it is provided with a downwardly-extending finger 87, adapted to ride on the circular hub of the pawl-carrier. Also pivoted to the segmental rack, but at a point near its lower end, preferably directly below the shaft 7, is an arm 90, Figs. 9 and 10, extending forward and upward in front of and in the plane of the pawl-carrier 52 and having its upper portion offset to lie against the arm 84. At its upper end the arm is provided with a rearwardly-extending finger 91, adapted to contact with the finger 83 of the pawl 54. The arm 90 is provided with a pin 92, which plays in the cam-slot 86 of the arm 84. A spring 93, coiled about a pin 94, secured to the segmental rack, bears at one end against a pin 95, secured to the pawl-carrier 52, and at its other end bears against a pin 96 on the arm 90 to hold the arm 90 normally in its forward position, the spring also serving to hold the segmental rack normally in depressed position.

A stationary rod 26, supported at its ends in the end plates 5, extends across the machine forward of and below the shaft 15, which carries the registering-wheels. On this rod 26 are rigidly secured rack-plates 97, the rear ends of the plates being secured to the stationary rod 17. One of the rack-plates is located directly in front of the arm 84 of each of the register-actuating devices. The under edge of the rack-plate opposite the arm 84 is arc-shaped and is provided with teeth 98, adapted to be engaged by the teeth 85 of the arm 84 when the free end of the latter is raised, as hereinafter described. When so engaged, the arm 84 and the segmental rack 56 are prevented from movement.

On the stationary rod 26 are pivoted detent-pawls 104, held by springs 100 in engagement with the teeth of the ratchet-wheel 108 of the registering-wheels.

The machine being arranged as shown in Fig. 1, the depression of any of the numeral-keys of the type-writing machine will, through the link 41 and the arm 33, cause the main shaft 7 to rock, the ends of the radial arms 9 passing freely beneath the hooked ends of the pawls 53 and 54, the pawl 53 being held in elevated position by the contact of the lower end 22 of the tripping device with the tailpiece 65 and the pawl 54 being held in elevated position by the contact of the finger 73 of the segmental rack with the tailpiece 82. On the release of the key the shaft 7 is returned to normal position by the spring 8. When the movement of the carriage brings the cam 133 against one of the dripping devices, depressing it, the tripping-arm 18 is swung on its bearing, moving its lower end back out of contact with the tailpiece 65, permitting the hooked end of the pawl 53 to drop into the path of the end of the radial arm 9. This movement of the tripping-arm carries the end of the finger 24 against the finger 66 on the end of the pawl, insuring its dropping into position to have its hooked end in the path of the radial arm. The pawl 53 being thus tripped, on the depression of any one of the numeral-keys the rocking of the main shaft will cause the pawl 53 and its pawl-carrier to rock with it, bringing the roller 67 against the cam 69, lifting the cam-plate 55. As the cam-plate rises it lifts with it the segmental rack, the finger 73 of the segmental rack being lifted out of the way of the tailpiece 82 of the pawl 54 and the finger 72 of the cam-plate being brought against the tailpiece 82 to depress the forward end of the pawl into the path of the end of the radial arm 9. The further movement of the rock-shaft by the engagement of the radial arm 9 with the pawl 54 rocks the pawl-carrier 52, and with it the segmental rack 56, forward. The teeth of the segmental rack being in mesh with the pinion 102, the registering-wheel is rotated until the proper numeral is opposite the sight-opening in the front plate 6, the detent-pawl 104 engaging the teeth of the ratchet-wheel 103 to prevent rearward movement. The movement given to the segmental rack is preferably sufficient to cause the registering-wheel to overthrow slightly, so as to carry the point of the tooth of the ratchet-wheel corresponding to the numeral to be registered slightly past the point of the detent, not, however, sufficiently to carry the point of the next tooth past the point of the detent. By thus slightly overthrowing and subsequently bringing the registering-wheel back to true position, as hereinafter described, certainty of operation is secured even after, by continued use, the parts become appreciably worn. By reason of the engagement of the teeth of the segment 36, carried by the lever 33, with the pivoted dog 37 the lever 33 and the register-actuating mechanism is held against reverse movement until it has completed its full stroke. As the lever 33 is drawn downward by the numeral-key its roller 86 enters the cam-slot 87 of the arm 31, secured to the rocking plate 29, causing the plate to be rocked to move its arms 30 rearward into the path of the segmental racks and the arms 90, carried by them. Before the key is fully depressed the arm 90 strikes the end of the stop-arm 30, and as the segmental rack continues its forward movement the pin 92, acting on the cam-slot 86, throws the free end of the arm 84 upward until its teeth 85 engage the teeth 98 of the rack-plate 97, locking the segmental rack against further forward movement. At the same time the finger 83 of the pawl 54 is brought against the end of the finger 91 of the arm 90, causing the pawl to be tilted on its pivot and its hooked end to be lifted out of engagement with the radial arm 9, so that in its further forward rocking movement the shaft moves freely so far as the segmental rack and the registering-wheel are concerned. The further forward rocking movement of the shaft carries with it to the completion of the stroke the pawl 53 and its carrier; but as these parts are light and move freely they offer practically no resistance to the free movement of the shaft. The shaft being thus practically freed from load, the key in completing its downward movement acts on its type-bar practically as freely as do the letter-keys or other keys not connected with the calculating device. The devices may be arranged to effect this freeing of the key from the register-actuating mechanism at any desired point in the depression of the key.

Having completed the movement necessary to effect the printing, the finger-key returns to normal position, and with it the rock-shaft under the influence of spring 8 also returns to normal position. As the lever 33 rises, carrying its pin 86 upward in the cam-slot 87, the rocking plate 29 carries the end of the stop-arm 30 forward away from the arm 90. The arm 90 is thus free to be tilted forward on its pivot by the spring 93, carrying its pin 92 downward in the cam-slot 86 of the arm 84, permitting the free end of this arm to fall, withdrawing its teeth 85 from engagement with the teeth 98 of the rack-plate 97, thus unlocking the segmental rack, the segmental rack remaining in its elevated position with its teeth in engagement with the pinion 102. The spring 151, acting through the arm 150, pivotally connected to the bearing-piece, draws the segmental rack backward, rotating the pinion 102 and the registering-wheel backward until its further backward movement is prevented by the pawl 104. This brings the registering-wheel back to true position, with the proper numeral in line with the sight-opening, correcting the overthrow previously given to the registering-wheel, as above described. In the further return movement of the rock-shaft the radial arm 9 acting against the finger 78 carries the pawl-carrier 51 rearward, and as the roller 67 of the pawl-carrier passes backward from beneath the flange 68 of the cam-plate the cam-plate, and with it the segmental rack, drops under the influence of the spring 93, withdrawing the teeth of the rack from the pinion 102. The segmental rack and pawl-carrier 52 are thus free to be returned to normal position by the spring 151 acting through the arm 150. The segmental rack being disconnected from the devices operated by the key before the completion of the depression of the key and remaining disconnected during the return of the several parts to normal position, the return of the key to normal position is effected quickly and the machine is ready to be again operated by the depression of a key without waiting for the segmental rack first operated to be unlocked and returned to normal position. The numeral-keys may thus be operated at normal speed notwithstanding that they not only operate their type-bars to print, but also operate the register of the calculating-machine.

For the purpose of carrying from a registering-wheel of a lower denomination to the registering-wheel of the next higher denomination each registering-wheel, except the one for the highest denomination, is provided on its side toward the next higher wheel with a radial pin 105, Fig. 16, having its end bent laterally, and is also provided with a cam 106.

Carried by the stationary rod 27, so as to rock freely thereon, is a double-armed carrying-pawl 28, Figs. 11, 20, 22, and 23, the arm 107 being arranged to be operated by the radial pin 105 and cam 106 of a lower registering-wheel and the arm 108 being arranged to effect the operation of the next higher registering-wheel. The double-armed pawl is provided with a finger 29', extending forward and upward, as shown. The arm 107 of the carrying-pawl 28 is forked, the end of its lower finger 109 being arranged in the path of the end of the arm 105 and its upper finger 110 having its end bent laterally into the plane of the cam 106. A collar 117 is secured to the rod 27 between the arms 107 and 108 of the pawl 28. From the collar an arm 118 extends forward and downward and at its end is forked to fit over the shaft 15. A spring 119, coiled about the rod 27 and engaging the finger 29', is arranged to press the forward ends of the arms 107 and 108 downward.

To the forward end of the arm 108 is pivoted the upper end of a pawl 111, arranged in the plane of the ratchet-wheel 103 of the higher registering-wheel and provided with a tooth 112 for engagement therewith. The upper end of the pawl 111 above its pivot is provided with a rearwardly-extending finger 113, against which a flat spring 114 presses to hold the lower end of the pawl normally in forward position. In rear of the tooth 112 the pawl 111 is notched at 115, and it is provided with a depending finger 116, offset out of the plane of the tooth 112. The cam-plate 55 is provided in rear of the cam 68 with an upwardly-extending arm 120. To the upper end of this arm is pivoted the end of the horizontal arm 122, Fig. 21, of an elbow-lever 121, the upper end of the vertical arm 123 of the lever being pivoted to the arm 118. The connection of the arm 122 with the arm 120 is formed by a pin on the arm 120 extending through a horizontal slot in the arm 122, so that the arm 122 may move rearward on its pivot, but moves with the arm 120 when the cam-plate carrying the latter is raised. The arm 123 of the lever 121 is offset at 124 out of the plane of the arm 122 and is provided near its juncture with the arm 122 with a laterally-bent lug 125, between which and the offset 124 the depending arm 116 of the pawl 111 is guided.

The arm 122 is provided with a pin 126, which extends into a cam-slot 130 in the depending arm 128 of an elbow-lever 127, arranged in the plane of the pawl 111, pivoted to the rack-plate 97 by a pin 131, the horizontal arm 129 of this lever extending forward and adapted to fit the notch 115 in the pawl to hold the tooth 112 in forward position in engagement with a tooth of the ratchet-wheel 103 to lock it against movement.

When the cam-plate is raised by the roller 67 of the pawl-carrier 51, as above described, the arm 120 raises the rear end of the arm 122, swinging the arm 122, together with the lower end of the arm 123, forward. By the action of the pin 126 in the slot 130 of the arm 128 the lever 127 is rocked on its pivot to move the end of the arm 129 downward out of engagement with the notch 115, leaving the free end of the pawl 111 free to swing rearward against the force of the spring 114. As the arm 123 swings rearward the lug 125 contacts with the lower end of the pawl and carries it rearward out of engagement with the ratchet-wheel 103. The registering-wheel is thus left free to be rotated by the segmental rack. On the return of the cam-plate to normal position the pawl 111 resumes its normal position, engaging the ratchet-wheel 103, locking the ratchet-wheel and the registering-wheel, to which it is secured, against movement in either direction, the arm 129 of the lever 127 engaging the notch 115 and holding the tooth in locked engagement with the ratchet-wheel.

As the lower registering-wheel is rotated by successively operating the numeral-keys to actuate its segmental rack the cam 106 gradually raises the end of the finger 110 of the arm 108 of the double-armed pawl 28, raising with it the end of the arm 108, lifting the pawl 111. As the registering-wheel completes a rotation the highest point of the cam has passed beneath the end of the finger 110, lifting the pawl 111 sufficiently high to disengage its tooth 112 from the tooth of the ratchet-wheel with which it was left in engagement on the previous movement of the registering-wheel and to permit it to be thrown into engagement with the next tooth by the action of the spring 114, and the highest point of the cam has passed beneath the end of the finger 110, permitting the finger, and with it the pawl 111, to drop under the influence of the spring 119, the return of the pawl to normal position being insured by the action of the end of the radial pin 105 against the end of the finger 109 of the arm 107 of the double-arm pawl. This downward movement of the pawl 111 rotates the higher registering-wheel one space.

The rack-plate 97 is provided in its rearwardly-extending portion with a bearing 97' to receive the hub of the registering-wheel, the plate fitting between the registering-wheel and its pinion 102, thus preventing lateral movement of the registering-wheel and also supporting it, together with its shaft 15, against downward movement. Any tendency of the shaft 15 to rise is prevented by the arm 118.

The shaft 15 is provided with resetting-pins 143, corresponding in number with the registering-wheels, of such length as to engage the laterally-projecting ends of the radial pins 105. The resetting-pins 143 are so placed that when the shaft is in normal position they will be out of the planes of the radial pins 105; but on shifting the shaft longitudinally the resetting-pins will be each brought into the plane of the end of a radial pin, so that when the shaft 15 is rotated the resetting-pins will strike the ends of the radial pins, and the registering-wheels being previously freed from the engagement of the pawls 111 with their ratchet-wheels they may be reset to zero.

The shaft 15 is provided at one end outside the end plate 5 with a milled head 144, having on its inner face a pin 145, adapted to enter an opening 146, Fig. 20, in the end plate when the shaft is in normal position. A spring 147, bearing at one end against the inner face of the end plate and at its other end bearing against a pin on the shaft, holds the shaft normally in such position that the resetting-pins are out of engagement with the radial pins 105. When in this position, the pin 145 enters the opening 146, holding the shaft locked. In order to rotate the shaft to reset the registering-wheels, the milled head 144 is drawn outward against the force of the spring 147, disengaging the pin 145 from the opening 146 and bringing the resetting-pins into position to engage the radial pins 105. The shaft is then rotated to reset the registering-wheels.

In order to free the registering-wheels to permit them to be reset to zero, it is necessary to disengage the pawls 111 from the ratchet-wheels 103. This is effected by means of a bail 160, carried by arms 161, (see Figs. 7 and 8,) having bearings on one of the fixed shafts and adapted when rocked to strike the upwardly-projecting fingers 28' of the double carrying-pawl. A finger-piece 162, extending through a slot in the front plate, is connected to the bail to move it to act on the fingers 28' to rock the double-armed pawl to lift the pawl 111.

The front plate is provided with sight-holes for each of the registering-wheels, through which the number registered may be seen.

Extending across the front of the front plate and supported by any convenient means is a rotary indicator 158, having at one end a milled head 159 for rotating it. The indicator is preferably triangular in cross-section and carries on one face at points between the third and fourth and between the sixth and seventh registering-wheels commas, and on another face carries between the second and third registering-wheels a period, and between the fifth and sixth and the eighth and ninth registering-wheels commas. This indicator is intended to be turned to indicate the relative position of the tripping devices.

By reason of the long horizontal arm 191 of the tripping devices the paper-carriage may be shifted without disengaging the tripping-cam from them.

Any number of tripping-cams may be used where it is desired to print and add numbers in several columns, the tripping-cams being adjusted on the bar 136 in accordance with the desired position of the columns. If it is desired to add two columns separately, the device may be used as two separate registers, using the registering-wheels in groups—as, for instance, using the first three or more of the registering-wheels as the register for one column and the remaining registering-wheels for the other column. In such use of the device the total of the columns must be printed and the registering-wheels reset to zero before the left-hand wheel of either group is rotated beyond "9," and in printing the numbers of the first column the numeral-keys will not be operated while the first tripping-cam is in contact with any one of the tripping devices of the second group of registering-wheels, and, conversely, the numeral-keys will not be operated while the second tripping-cam is in contact with any one of the tripping devices of the first group of registering devices. This use of two tripping devices with the registering-wheel used in groups will be found convenient when it is desired to place in one column the number of articles sold and in the second column the values of the articles. The two columns may be arranged at opposite sides of the sheet and any desired matter may be printed between the two columns.

Where it is desired to print the numbers in separate columns and to add the numbers so printed, tripping-cams corresponding in number with the number of columns will be used, the total of all the columns together being shown on the register. In making an itemized statement of checks paid this arrangement will give the items in several columns on a sheet of any width desired, instead of in a single column on a long strip or roll.

When it is desired to print the total, the lever 141 is thrown upward by means of the finger-piece 142, raising the cam 133 above the plane of the tripping devices. The total shown by the registering-wheels may then be printed by the numeral-keys without effecting any movement of the registering devices.

When it is desired to use the type-writing machine for ordinary purposes, the bar 48 may be swung rearward by means of its arms 49, disengaging the links from the numeral-keys.

It will be understood that the invention is not limited to the precise construction shown and described, as it is obvious that changes in details of construction and arrangement may be made without affecting the essential features of the invention.

Having thus described my invention, what I claim as new, and desire to secure by Letters Patent, is—

1. In a calculating-machine the combination of a registering device, register-actuating mechanism therefor, operating means normally disconnected from the register-actuating mechanism and means for connecting the operating means with the register-actuating mechanism comprising a tripping-arm, a tripping device connected with the tripping-arm and means for actuating the tripping device; substantially as described.

2. In a calculating-machine the combination of a registering device, register-actuating mechanism therefor, operating means normally disconnected from the register-actuating mechanism and means for connecting the operating means with the register-actuating mechanism comprising a pivoted tripping-arm, a sliding tripping device connected with the tripping-arm, and means for actuating the tripping device; substantially as described.

3. In a calculating-machine the combination of a registering device, register-actuating mechanism therefor, operating means normally disconnected from the register-actuating mechanism and means for connecting the operating means with the register-actuating means comprising a tripping-arm, a tripping device connected with the tripping-arm but adjustable relative thereto, and means for actuating the tripping device; substantially as described.

4. In a calculating-machine the combination of a registering device, register-actuating mechanism therefor, operating means normally disconnected from the register-actuating mechanism and means for connecting the operating means with the register-actuating means comprising a pivoted tripping-arm, a sliding tripping device connected with the tripping-arm but adjustable relative thereto, and means for actuating the tripping device; substantially as described.

5. In a calculating-machine the combination of a registering device, register-actuating mechanism therefor, operating means normally disconnected from the register-actuating mechanism and means for connecting the operating means with the register-operating mechanism comprising a tripping-arm, a tripping device connected with the tripping-arm but adjustable relative thereto, means for shifting the position of the tripping device, and means for actuating the tripping device; substantially as described.

6. In a calculating-machine the combination of a registering device, register-actuating mechanism therefor, operating means normally disconnected from the register-actuating mechanism and means for connecting the operating means with the register-operating mechanism comprising a pivoted tripping-arm, a sliding tripping device connected with the tripping-arm but adjustable relative thereto, means for shifting the position of the tripping device, and means for actuating the tripping device; substantially as described.

7. In a calculating-machine the combination of a series of registering devices, register-actuating mechanisms therefor, operating means normally disconnected from said register-actuating mechanisms and means for connecting the operating means with the register-actuating mechanism comprising a series of tripping-arms, a series of tripping devices, each connected with one of said tripping-arms and a common means for actuating the tripping devices; substantially as described.

8. In a calculating-machine the combination of a series of registering devices, register-actuating mechanism therefor, operating means normally disconnected from said register-actuating mechanism, and means for connecting the operating means with the register-actuating mechanism comprising a series of tripping-arms, a series of tripping devices each connected with one of said tripping-arms and a plurality of means for actuating the tripping devices; substantially as described.

9. In a calculating-machine for use in connection with a type-writing machine, the combination of a registering device, register-actuating mechanism therefor, operating means normally disconnected from the register-actuating mechanism, and means for connecting the operating means with the register-actuating mechanism comprising a tripping-arm, a tripping device connected with the tripping-arm, and means carried by a movable part of the type-writing machine for actuating the tripping device; substantially as described.

10. In a calculating-machine for use in connection with a type-writing machine, the combination of a registering device, register-actuating mechanism therefor, operating means normally disconnected from the register-actuating mechanism, and means for connecting the operating means with the register-actuating mechanism comprising a tripping-arm, a tripping device connected with the tripping-arm, and means carried by a movable part of the type-writing machine and adjustable thereon for actuating the tripping device; substantially as described.

11. In a calculating-machine for use in connection with a type-writing machine, the combination of a registering device, register-actuating mechanism therefor, operating means normally disconnected from the register-actuating mechanism, and means for connecting the operating means with the register-actuating mechanism comprising a tripping-arm, a tripping device connected with the tripping-arm, and a plurality of means carried by a movable part of the type-writing machine for actuating the tripping device; substantially as described.

12. In a calculating-machine for use in connection with a type-writing machine, the combination of a registering device, register-actuating mechanism therefor, operating means normally disconnected from the register-actuating mechanism, and means for connecting the operating means with the register-actuating mechanism comprising a tripping-arm, a tripping device connected with the tripping-arm, and a plurality of means carried by a movable part of the type-writing machine and each adjustable thereon for actuating the tripping device; substantailly as described.

13. In a calculating-machine for use in connection with a type-writing machine having a movable carriage, the combination of a registering device, register-actuating mechanism therefor, operating means normally disconnected from the register-actuating mechanism, and means for connecting the operating means with the register-actuating mechanism comprising a tripping-arm, a tripping device connected with the tripping-arm, and means carried by the carriage of the type-writing machine for actuating the tripping device; substantially as described.

14. In a calculating-machine for use in connection with a type-writing machine having a movable carriage, the combination of a registering device, register-actuating mechanism therefor, operating means normally disconnected from the register-actuating mechanism, and means for connecting the operating means with the register-actuating mechanism comprising a tripping-arm, a tripping device connected with the tripping-arm, and means carried by the carriage of the type-writing machine and adjustable thereon, for actuating the tripping device; substantially as described.

15. In a calculating-machine for use in connection with a type-writing machine having a movable carriage, the combination of a registering device, register-actuating mechanism therefor, operating means normally disconnected from the register-actuating mechanism, and means for connecting the operating means with the register-actuating mechanism comprising a tripping-arm, a tripping device connected with the tripping-arm, and a plurality of means carried by the carriage of the type-writing machine for actuating the tripping device; substantially as described.

16. In a calculating-machine for use in connection with a type-writing machine having a movable carriage, the combination of a registering device, register-actuating mechanism therefor, operating means normally disconnected from the register-actuating mechanism, and means for connecting the operating means with the register-actuating mechanism comprising a tripping-arm, a tripping device connected with the tripping-arm, and a plurality of means carried by the carriage of the type-writing machine and each adjustable thereon for actuating the tripping device; substantially as described.

17. In a calculating-machine for use in connection with a type-writing machine having a movable and shiftable carriage, the combination of a registering device, register-actuating mechanism therefor, operating means normally disconnected from the register-actuating mechanism, and means for connecting the operating means with the register-actuating means comprising a vertically-movable tripping-arm, a tripping device connected with the tripping-arm and means carried by the carriage of the type-writing machine for actuating the tripping device, the tripping device having a horizontal arm of such length that the actuating means will contact with it whether the carriage is in normal position or shifted position; substantially as described.

18. In a calculating-machine for use in connection with a type-writing machine having a movable carriage, provided with a toothed bar, the combination of a registering device, register-actuating mechanism therefor, operating means normally disconnected from the register-actuating mechanism, and means for connecting the operating means with the register-actuating means comprising a tripping-arm, a tripping device connected with the tripping-arm, means for actuating the tripping device, comprising a plate arranged to slide on the toothed bar, a detent adapted to engage the teeth of the bar for holding the plate in adjusted position, a pivoted lever carrying a cam adapted to engage the tripping device, and means for holding the lever in either elevated or depressed position; substantially as described.

19. In a calculating-machine for use in connection with a type-writing machine, the combination with a finger-key of a type-writing machine, of a registering device, register-actuating mechanism therefor, means operated by the key for operating the register-actuating mechanism, and means for disconnecting the register-actuating mechanism from the means operated by the key, the disconnecting means being arranged to operate at such point in the downward movement of the key that further depression of the key may take place after such disconnection; substantially as described.

20. In a calculating-machine for use in connection with a type-writing machine, the combination with a finger-key of the type-writing machine, of a registering device, register-actuating mechanism, operating means connected with the key for operating the register-actuating mechanism, means actuated by the initial depression of the key for connecting the operating means with the register-actuating mechanism, and means operated by the further depression of the key for disconnecting the register-actuating mechanism from the operating means, the disconnecting means being arranged to operate at such point in the downward movement of the key that further depression of the key may take place after such disconnection; substantially as described.

21. In a calculating-machine for use in connection with a type-writing machine, the combination with a finger-key of the type-writing machine, a register-wheel, a rack for actuating the register, operating means connected with the key for operating the rack, means actuated by the initial depression of the key for connecting the operating means with the rack, and means operated by the further depression of the key for disconnecting the rack from the operating means, the disconnecting means being arranged to operate at such point in the downward movement of the key that further depression of the key may take place after such disconnection; substantially as described.

22. In a calculating-machine for use in connection with a type-writing machine, the combination with a finger-key of the type-writing machine, of a register-wheel, a rack for actuating the register-wheel, operating means connected with the key for operating the rack, means actuated by the initial depression of the key for connecting the operating means with the rack, means for locking the rack on the completion of its movement, and means operated by the further depression of the key for disconnecting the rack from the operating means; substantially as described.

23. In a calculating-machine for use in connection with a type-writing machine, the combination with a finger-key of the type-writing machine, of a register-wheel, a rack for actuating the register-wheel, operating means connected with the key for operating the rack, means actuated by the initial depression of the key for connecting the operating means with the rack, means for locking the rack on the completion of its movement, means operated by the further depression of the key for disconnecting the rack from the operating means, and means operated by the return of the key to normal position, for releasing the rack; substantially as described.

24. In a calculating-machine for use in connection with a type-writing machine, the combination of a finger-key of the type-writing machine, of a register-wheel, a rack for actuating the register-wheel, operating means connected with the key for operating the rack, means actuated by the initial depression of the key for connecting the operating means with the rack, means for locking the rack on the completion of its movement, means operated by the further depression of the key for disconnecting the rack from the operating means, means operated by the return of the key to normal position, for releasing the rack, and independent means for returning the rack to normal position; substantially as described.

25. In a calculating-machine, the combination of a registering-wheel and actuating mechanism therefor, means for operating the register-actuating mechanism to cause the registering-wheel to overthrow, means for disconnecting the register-actuating mechanism from the operating means, and means for operating the register-actuating mechanism to cause the rotation of the registering-wheel necessary to correct its overthrow; substantially as described.

26. In a calculating-machine, the combination of a registering device and actuating mechanism therefor, means for operating the register-actuating mechanism to move the registering device beyond the proper registering-point, means for disconnecting the register-actuating mechanism from the operating means, means independent of the operating means for moving the register-actuating mechanism in reverse direction to move the registering device back to the proper registering-point and means for locking the registering device in its final position; substantially as described.

27. In a calculating-machine, the combination of a registering-wheel and actuating mechanism therefor, means for operating the register-actuating mechanism to rotate the registering-wheel beyond the proper registering-point, independent means for actuating the register-actuating mechanism in reverse direction to turn the registering-wheel back to proper registering-point, and means for locking the registering-wheel in its final position; substantially as described.

28. In a calculating-machine, the combination of a registering device and actuating mechanism therefor, means for operating the register-actuating mechanism to move the registering device beyond the proper registering-point, means for disconnecting the register-actuating mechanism from the operating means, and for locking the register-actuating mechanism against further forward movement, means for moving the register-actuating mechanism in reverse direction to move the registering device back to the proper registering-point, means operated by the return of the operating means to unlock the register-actuating mechanism and to lock the registering device against movement, and means for returning the register-actuating mechanism to normal position; substantially as described.

29. In a calculating-machine, the combination of a registering device, register-actuating mechanism normally out of engagement with the registering device, means for moving the register-actuating mechanism into engagement with the registering device and for operating it to move the registering device beyond the proper registering position, means for disconnecting the register-actuating mechanism from the operating means and for locking the register-actuating mechanism against further forward movement, means for moving the register-actuating mechanism in reverse direction to move the registering device back to the proper registering position, means for locking the registering device in its final position, means for unlocking the register-actuating mechanism and disengaging it from the registering device, and means for returning the register-actuating mechanism to normal position; substantially as described.

30. In a calculating-machine, the combination of a registering device, register-actuating mechanism therefor, operating means normally disconnected from the register-actuating mechanism and means for connecting the operating means with the register-actuating mechanism comprising a pivoted pawl, a tripping-arm arranged to normally hold the pawl out of engagement with the operating means, and means for actuating the tripping-arm to release the pivoted pawl to permit it to be engaged by the operating means; substantially as described.

31. In a calculating-machine, the combination of a registering device, register-actuating mechanism therefor, operating means normally disconnected from the register-actuating mechanism, means for connecting the operating means with the register-actuating mechanism comprising a pivoted pawl mounted to move with the register-actuating mechanism normally held out of engagement with the operating means, means for releasing the pawl to permit it to be engaged by the operating means and means for disengaging the pawl from the operating means on the completion of the forward movement of the register-actuating mechanism; substantially as described.

32. In a calculating-machine, the combination of a registering device, register-actuating mechanism therefor, means for operating the register-actuating mechanism, means for connecting the operating means with the register-actuating mechanism, comprising a pivoted pawl mounted to move with the register-actuating mechanism normally held out of engagement with the operating means, means for releasing the pivoted pawl to permit it to be engaged by the operating means, comprising a pawl mounted to move independently of the register-actuating mechanism held normally out of engagement with the operating means, and means for releasing the pawl, to permit it to be engaged by the operating means; substantially as described.

33. In a calculating-machine, the combination of a registering-wheel and actuating mechanism therefor, means for operating the register-actuating mechanism normally disconnected therefrom, a tripping device arranged, when operated, to connect the register-actuating mechanism with the operating means, means for operating the tripping device, means actuated by the operating means for locking the register-actuating mechanism in the position to which it is moved by the operating means, and for disconnecting the register-actuating mechanism from the operating means, means operated by the operating means for unlocking the register-actuating mechanism and means for returning the register-actuating mechanism to normal position; substantially as described.

34. In a calculating-machine, the combination of a main shaft provided with radial arms, means for rocking the main shaft, a registering device, a segmental rack for actuating the registering device, mounted to rotate concentric with the main shaft, a pawl connected with the segmental rack for engaging one of the radial arms, an arm carried by the segmental rack arranged, when operated, to disengage the pawl from the radial arm, and means operated by the means for rocking the shaft for operating the arm carried by the segmental rack to effect the disengagement of the pawl from the radial arm; substantially as described.

35. In a calculating-machine, the combination of a main shaft provided with radial arms, means for rocking the main shaft, a registering device, a segmental rack for actuating the registering device, mounted to rotate concentric with the main shaft, a pawl connected with the segmental rack for engaging one of the radial arms, an arm carried by the segmental rack arranged, when operated, to disengage the pawl from the radial arm, and a rocking plate carrying an arm, means for rocking the rocking plate to bring its arm into the path of the arm carried by the segmental rack; substantially as described.

36. In a calculating-machine, the combination of a main shaft provided with radial arms, means for rocking the main shaft, a registering device, a pawl-carrier rotatably mounted concentric with the main shaft, having a pawl pivoted thereto adapted to engage one of the radial arms, a segmental rack for actuating the registering device mounted to rotate with the pawl-carrier and also to move vertically with reference to the pawl-carrier, means for holding the segmental rack normally in depressed position, means for raising the segmental rack and depressing the pawl to engage the radial arm, and means carried by the segmental rack for holding the pawl out of engagement with the radial arm when the segmental rack is in normal position; substantially as described.

37. In a calculating-machine, the combination of a main shaft provided with radial arms, means for rocking the main shaft, a registering device, a pawl-carrier rotatably mounted concentric with the main shaft, having a pawl pivoted thereto adapted to engage one of the radial arms, and provided with a tailpiece, a segmental rack for actuating the registering device, mounted to rotate with the pawl-carrier and also to move vertically with reference to the pawl-carrier, means for holding the segmental rack normally in depressed position, means for raising the segmental rack and depressing the pawl to engage the radial arm, and a laterally-extending finger carried by the segmental rack for engaging the tailpiece of the pawl to hold the pawl out of engagement with the radial arm when the segmental rack is in normal position; substantially as described.

38. In a calculating-machine, the combination of a main shaft provided with radial arms, means for rocking the main shaft, a registering device, a pawl-carrier rotatably mounted concentric with the main shaft, having a pawl-carrier pivoted thereto adapted to engage one of the radial arms, a segmental rack for actuating the registering device mounted to rotate with the pawl-carrier and also to move vertically with reference to the pawl-carrier, means for raising the segmental rack and depressing the pawl to engage the radial arm, and means carried by the segmental rack for disengaging the pawl from the radial arm while the segmental rack is in raised position; substantially as described.

39. In a calculating-machine, the combination of a main shaft provided with radial arms, means for rocking the main shaft, a registering device, a pawl-carrier rotatably mounted concentric with the main shaft, having a pawl-carrier pivoted thereto adapted to engage one of the radial arms and provided with an upwardly-extending finger, a segmental rack for actuating the registering device mounted to rotate with the pawl-carrier and also to move vertically with reference to the pawl-carrier, means for raising the segmental rack and depressing the pawl to engage the radial arm, and means carried by the segmental rack for engaging the finger-piece of the pawl to disengage the pawl from the radial arm while the segmental rack is in raised position; substantially as described.

40. In a calculating-machine, the combination of a main shaft provided with radial arms, means for rocking the main shaft, a registering device, a pawl-carrier rotatably mounted concentric with the main shaft, having a pawl-carrier pivoted thereto adapted to engage one of the radial arms, a segmental rack for actuating the registering device mounted to rotate with the pawl-carrier and also to move vertically with reference to the pawl-carrier, means operated by the rocking of the main shaft for raising the segmental rack and depressing the pawl to engage the radial arm, and means carried by the segmental rack for disengaging the pawl from the radial arm while the segmental rack is in raised position; substantially as described.

41. In a calculating-machine, the combination of a main shaft provided with radial arms, means for rocking the main shaft, a registering device, a pawl-carrier rotatably mounted concentric with the main shaft, having a pawl-carrier pivoted thereto adapted to engage one of the radial arms and provided with an upwardly-extending finger, a segmental rack for actuating the registering device, mounted to rotate with the pawl-carrier and also to move vertically with reference to the pawl-carrier, means operated by the rocking of the main shaft for raising the segmental rack and depressing the pawl to engage the radial arm, and means carried by the segmental rack for engaging the finger-piece of the pawl to disengage the pawl from the radial arm while the segmental rack is in raised position; substantially as described.

42. In a calculating-machine, the combination of a main shaft provided with radial arms, means for rocking the main shaft, a registering device, a pawl-carrier rotatably mounted concentric with the main shaft, having a pawl pivoted thereto adapted to engage one of the radial arms, a segmental rack for actuating the registering device, mounted to rotate with the pawl-carrier and also to move vertically with reference to the pawl-carrier, means for holding the segmental rack normally in depressed position, means for raising the segmental rack and depressing the pawl to engage the radial arm, means carried by the segmental rack for holding the pawl out of engagement with the radial arm when the segmental rack is in normal position, and means also carried by the segmental rack for freeing the pawl from engagement with the radial arm while the segmental rack is in raised position; substantially as described.

43. In a calculating-machine, the combination of a main shaft provided with radial arms, means for rocking the main shaft, a registering device, a pawl-carrier rotatably mounted concentric with the main shaft, having a pawl pivoted thereto adapted to engage one of the radial arms and provided with a tailpiece, a segmental rack for actuating the registering device, mounted to rotate with the pawl-carrier and also to move vertically with reference to the pawl-carrier, means for holding the segmental rack normally in depressed position, means for raising the segmental rack and depressing the pawl to engage the radial arm, means carried by the segmental rack for engaging the tailpiece of the pawl to hold the pawl out of engagement with the radial arm when the segmental rack is in normal position, and means also carried by the segmental rack for freeing the pawl from engagement with the radial arm while the segmental rack is in raised position; substantially as described.

44. In a calculating-machine, the combination of a main shaft provided with radial arms, means for rocking the main shaft, a registering device, a pawl-carrier rotatably mounted concentric with the main shaft, having a pawl pivoted thereto adapted to engage one of the radial arms and provided with a tailpiece and an upwardly-extending finger, a segmental rack for actuating the registering device, mounted to rotate with the pawl-carrier and also to move vertically with reference to the pawl-carrier, means for holding the segmental rack normally in depressed position, means for raising the segmental rack and depressing the pawl to engage the radial arm, means carried by the segmental rack for engaging the tailpiece of the pawl to hold the pawl out of engagement with the radial arm when the segmental rack is in normal position, and means also carried by the segmental rack for acting on the finger of the pawl to free the pawl from engagement with the radial arm while the segmental rack is in raised position; substantially as described.

45. In a calculating-machine, the combination of a main shaft provided with radial arms, means for rocking the main shaft, a registering device, register-actuating mechanism therefor, mounted to rotate concentric with the main shaft, means connected with the register-actuating means for engaging one of the radial arms, a stationary toothed rack-plate, a toothed arm carried by the register-actuating means for engaging the teeth of the rack-plate and means operated by the means for rocking the main shaft for operating the toothed arm carried by the register-actuating means to cause it to engage the teeth of the rack-plate to lock the register-actuating means against further forward movement; substantially as described.

46. In a calculating-machine, the combination of a main shaft provided with radial arms, means for rocking the main shaft, a registering device, a segmental rack for actuating the registering device, mounted to rotate concentric with the main shaft, means connected with the segmental rack for engaging one of the radial arms, a stationary toothed rack-plate, a toothed arm carried by the segmental rack for engaging the teeth of the rack-plate and means operated by the means for rocking the main shaft for operating the toothed arm carried by the segmental rack to cause it to engage the teeth of the rack-plate to lock the segmental rack against further forward movement; substantially as described.

47. In a calculating-machine, the combination of a main shaft provided with radial arms, means for rocking the main shaft, a registering device, register-actuating mechanism therefor, mounted to rotate concentric with the main shaft, means connected with the register-actuating means for engaging one of the radial arms, means for locking the registering device against rearward movement, a stationary toothed rack-plate, a toothed arm carried by the register-actuating means for engaging the teeth of the rack-plate and means operated by the means for rocking the main shaft for operating the toothed arm carried by the register-actuating means to cause it to engage the teeth of the rack-plate to lock the register-actuating means against further forward movement; substantially as described.

48. In a calculating-machine, the combination of a main shaft provided with radial arms, a registering device, register-actuating mechanism therefor normally disconnected from the registering device, means for moving the register-actuating mechanism into connection with the registering device, means connected with the register-actuating mechanism for engaging one of the radial arms, means for locking the registering device against rearward movement, and means for locking the register-actuating mechanism against further forward movement on the completion of its stroke; substantially as described.

49. In a calculating-machine, the combination of a main shaft provided with radial arms, means for rocking the main shaft, a registering device, a pawl-carrier rotatably mounted concentric with the main shaft, having a pawl pivoted thereto adapted to engage one of the radial arms, a segmental rack for actuating the registering device, mounted to rotate with the pawl-carrier and also to move vertically with reference to the pawl-carrier, means for raising the segmental rack and for depressing the pawl to engage the radial arm, a stationary toothed rack-plate, and means carried by the segmental rack, adapted to engage the rack-plate to lock the rack-plate against further forward movement on the completion of its movement; substantially as described.

50. In a calculating-machine, the combination of a main shaft provided with radial arms, means for rocking the main shaft, a pawl-carrier rotatably mounted concentric with the main shaft, having a pawl pivoted thereto, adapted to engage one of the radial arms, a segmental rack mounted to rotate with the pawl-carrier and also to move vertically with reference to the pawl-carrier, a register-wheel carrying a pinion with which the segmental rack meshes when in raised position, means for raising the segmental rack and for depressing the pawl to engage the radial arm, a stationary toothed rack-plate, and means carried by the segmental rack, adapted to engage the rack-plate to lock the rack-plate against further forward movement on the completion of its movement; substantially as described.

51. In a calculating-machine, the combination of a main shaft provided with radial arms, means for rocking the main shaft, a registering device, a pawl-carrier rotatably mounted concentric with the main shaft, having a pawl pivoted thereto adapted to engage one of the radial arms, a segmental rack for operating the registering means, mounted to rotate with the pawl-carrier and also to move vertically with reference to the pawl-carrier, means for raising the segmental rack and for depressing the pawl to engage the radial arm, a stationary toothed rack-plate, an arm carried by the segmental rack provided with teeth for engaging the teeth of the rack-plate, means carried by the rack for operating the arm to lock the segmental rack against further forward movement and for simultaneously disengaging the pawl from the radial arm; substantially as described.

52. In a calculating-machine, the combination of a main shaft provided with radial arms, means for rocking the main shaft, a pawl-carrier rotatably mounted concentric with the main shaft, having a pawl pivoted thereto adapted to engage one of the radial arms, a segmental rack mounted to rotate with the pawl-carrier and also to move vertically with reference to the pawl-carrier, a register-wheel carrying a pinion with which the segmental rack meshes when in raised position, means for raising the segmental rack and for depressing the pawl to engage the radial arm, a stationary toothed rack-plate, an arm carried by the segmental rack provided with teeth for engaging the teeth of the rack-plate, means carried by the rack for operating the arm to lock the segmental rack against further forward movement and simultaneously disengaging the pawl from the radial arm; substantially as described.

53. In a calculating-machine, the combination of a main shaft provided with a pair of radial arms, means for rocking the main shaft, a registering device, a pawl-carrier provided with a pawl adapted to engage one of the pair of radial arms, register-actuating mechanism normally out of engagement with the registering device, means operated by the pawl-carrier for shifting the register-actuating mechanism into engagement with the registering device, the pawl-carrier being arranged to be returned to normal position with the shaft, a second pawl-carrier arranged to rotate with the register-actuating mechanism, provided with a pawl adapted to be engaged by the other of the pair of radial arms to effect the movement of the register-actuating mechanism, means for disengaging the pawl of the second pawl-carrier from its radial arm, and means independent of the rock-shaft for returning the registering mechanism and second pawl-carrier to normal position; substantially as described.

54. In a calculating-machine, the combination of a main shaft provided with a radial arm, means for rocking the main shaft, a stationary rod below the main shaft, a pawl-carrier mounted to rotate concentric with the main shaft, carrying a pawl, adapted to be engaged by the radial arm in its forward movement, and provided with a laterally-extending finger arranged to be engaged by the radial arm in its return movement, the pawl-carrier being also provided with a downwardly-extending stop-arm adapted to rest against the stationary rod when the pawl-carrier is in normal position; substantially as described.

55. In a calculating-machine, the combination of a registering device, register-actuating mechanism therefor comprising a pawl-carrier having an open bearing, a bearing-piece provided with an annular groove adapted to receive and guide the pawl-carrier, and a suitable support on which the bearing-piece is journaled; substantially as described.

56. In a calculating-machine, the combination of a registering device, register-actuating mechanism therefor comprising a pawl-carrier and a cam-plate, each having an open bearing, a bearing-piece provided with annular grooves adapted to receive and guide the pawl-carrier and cam-plate, and a suitable support on which the bearing-piece is journaled; substantially as described.

57. In a calculating-machine, the combination of a registering device, register-actuating mechanism therefor comprising a pawl-carrier and a cam-plate, each having an open bearing, and a segmental rack having a non-circular opening therein, a bearing-piece provided with annular grooves adapted to receive and guide the pawl-carrier and cam-plate, and a non-circular portion adapted to receive and guide the segmental rack, and a suitable support on which the bearing-piece is journaled; substantially as described.

58. In a calculating-machine, the combination of a main shaft, provided with radial arms, means for rocking the main shaft, a registering device, a stationary sleeve concentric with the main shaft, a bearing-piece rotatably mounted on the stationary sleeve, register-actuating mechanism carried by the bearing-piece, comprising means for engaging one of the radial arms, and means connected directly with the bearing-piece for returning the register-actuating mechanism to normal position independently of the rock-shaft; substantially as described.

59. In a calculating-machine, the combination of a main shaft, provided with radial arms, means for rocking the main shaft, a registering device, a stationary sleeve concentric with the main shaft, a bearing-piece rotatably mounted on the stationary sleeve, register-actuating mechanism carried by the bearing-piece, comprising a segmental rack mounted to rotate with the bearing-piece, means for engaging one of the radial arms and means connected directly with the bearing-piece for returning the register-actuating mechanism to normal position independently of the rock-shaft; substantially as described.

60. In a calculating-machine, the combination of a main shaft, provided with radial arms, means for rocking the main shaft, a registering device, a stationary sleeve concentric with the main shaft, a bearing-piece rotatably mounted on the stationary sleeve, register-actuating mechanism carried by the bearing-piece, comprising a segmental rack mounted to rotate with the bearing-piece, means for engaging one of the radial arms, and spring-actuated means connected directly with the bearing-piece for returning the register-actuating mechanism to normal position independently of the rock-shaft; substantially as described.

61. In a calculating-machine, the combination of a main shaft provided with a radial arm, means for rocking the main shaft, a stationary sleeve concentric with the main shaft, a registering device, a bearing-piece rotatably mounted on the stationary sleeve, register-actuating mechanism, comprising a segmental rack mounted to rotate with the bearing-piece, means connected with the segmental rack for engaging the radial arm whereby the rocking of the shaft effects movement of the segmental rack in one direction and means connected directly to the bearing-piece for returning the segmental rack to normal position independent of the movement of the main shaft; substantially as described.

62. In a calculating-machine, the combi-

...nation of a main shaft provided with radial arms, a registering device, register-actuating mechanism therefor arranged to be operated by the radial arms, means for rocking the main shaft comprising a lever mounted to rotate concentric with the main shaft provided with means for engaging one of the radial arms, and means for insuring a full stroke of the lever, comprising a toothed segment connected with the lever and a pivoted pawl mounted on a stationary rod, arranged to engage the toothed segment; substantially as described.

63. In a calculating-machine for use in connection with a type-writing machine, the combination with a main shaft, a lever mounted to rotate concentric with the main shaft for rocking the shaft, a link connected with the lever at one end and at the other end provided with an open slot for engaging a pin carried by a key-lever of the type-writing machine, an upwardly-extending arm connected with the link and a swinging bar having a slot through which the upwardly-extending arm moves freely; substantially as described.

64. In a calculating-machine for use in connection with a type-writing machine, the combination with a main shaft, a series of levers mounted to rotate concentric with the main shaft for rocking the shaft, a series of links one for each lever, each connected with its lever at one end and at the other end provided with an open slot for engaging a pin carried by a key-lever of the type-writing machine, an upwardly-extending arm connected with each of the links and a swinging bar having a series of slots through which the upwardly-extending arms move freely; substantially as described.

65. In a calculating-machine, the combination of a rock-shaft provided with a radial arm, means for rocking the main shaft, a pawl-carrier mounted to rotate concentric with the main shaft, a pawl pivotally mounted on the pawl-carrier, having its forward end hooked to engage the radial arm and also provided with a tailpiece, and a tripping-arm pivoted above and in rear of the main shaft, having its lower end adapted to engage the tailpiece of the pawl to hold its forward end out of engagement with the radial arm, and also having a forwardly-extending arm, adapted to engage the forward end of the pawl to depress it into engagement with the radial arm when the tripping-arm is tilted, and means for tilting the tripping-arm; substantially as described.

66. In a calculating-machine, the combination of a rock-shaft provided with a radial arm, means for rocking the main shaft, a pawl-carrier mounted to rotate concentric with the main shaft, a pawl pivotally mounted on the pawl-carrier, having its forward end hooked to engage the radial arm and also provided with a tailpiece, and a tripping-arm pivoted above and in rear of the main shaft, having its lower end adapted to engage the tailpiece of the pawl to hold its forward end out of engagement with the radial arm, and also having a forwardly-extending arm adapted to engage the forward end of the pawl to depress it into engagement with the radial arm when the tripping-arm is tilted, and means for tilting the tripping-arm; comprising a tripping device laterally movable with reference to the tripping-arm; substantially as described.

67. In a calculating-machine, the combination of a rock-shaft provided with a radial arm, means for rocking the main shaft, a pawl-carrier mounted to rotate concentric with the main shaft, a pawl pivotally mounted on the pawl-carrier, having its forward end hooked to engage the radial arm and also provided with a tailpiece, and a tripping-arm pivoted above and in rear of the main shaft, having its lower end adapted to engage the tailpiece of the pawl to hold its forward end out of engagement with the radial arm, and also having a forwardly-extending arm formed integrally with the tripping-arm, adapted to engage the forward end of the pawl to depress it into engagement with the radial arm when the tripping-arm is tilted, and means for tilting the tripping-arm; substantially as described.

68. In a calculating-machine the combination of a registering device, register-actuating mechanism therefor, operating means normally disengaged from the register-actuating mechanism, means for connecting the operating means with the register-operating mechanism comprising a tripping-arm, a tripping device connected with the tripping-arm, having a vertical portion, a box in which the vertical portion of the tripping device is adapted to slide, a spring normally maintaining the tripping device in elevated position, fixed rods on which the box is adapted to slide, a rotatable shaft carrying a cam, a projection on the box engaging said cam, and means for depressing the tripping device to operate the tripping-arm; substantially as described.

69. In a calculating-machine the combination of a series of registering devices, a series of register-actuating mechanisms therefor, operating means normally disengaged from the register-actuating mechanisms, means for connecting the operating means with any one of the register-operating mechanisms comprising a series of tripping-arms, a series of tripping devices connected with the tripping-arm arranged in a group, each having a vertical portion, a series of boxes in which the vertical portions of the tripping device are adapted to slide, springs normally maintaining the tripping devices in elevated position, fixed rods on which the boxes are adapted to slide, a rotatable shaft carrying a cam, projections on the boxes engaging said cam, springs on the fixed rods normally holding the outer members of the group of tripping devices against outward movement, and means for depressing the tripping device to operate the tripping-arm; substantially as described.

In testimony whereof I affix my signature in presence of two witnesses.

JOHN T. HOWIESON.

Witnesses:
A. K. PEDRICK,
ROBERT T. BICKNELL.